United States Patent
Prock et al.

(10) Patent No.: US 10,020,869 B1
(45) Date of Patent: Jul. 10, 2018

(54) WIRELESS REPEATER CHAIN TO EXERT FREQUENCY CONTROL

(71) Applicant: Sprint Communications Company L.P., Overland Park, KS (US)

(72) Inventors: John W. Prock, Peculiar, MO (US); Sreekar Marupaduga, Overland Park, KS (US); Walter F. Rausch, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/364,685

(22) Filed: Nov. 30, 2016

(51) Int. Cl.
| | |
|---|---|
| *H04B 7/15* | (2006.01) |
| *H04W 16/26* | (2009.01) |
| *H04W 88/04* | (2009.01) |
| *H04B 7/155* | (2006.01) |
| *H04L 5/00* | (2006.01) |

(52) U.S. Cl.
CPC ..... *H04B 7/15507* (2013.01); *H04B 7/15535* (2013.01); *H04L 5/0048* (2013.01); *H04B 7/15578* (2013.01); *H04W 16/26* (2013.01); *H04W 88/04* (2013.01)

(58) Field of Classification Search
CPC .. H04B 7/15535; H04B 7/15578; H04B 7/15; H04W 16/26; H04W 88/04
USPC ......................................... 455/11.1, 7, 9, 24
See application file for complete search history.

(56) References Cited

U.S. PATENT DOCUMENTS

| | | | |
|---|---|---|---|
| 6,889,033 B2 | 5/2005 | Bongfeldt | |
| 7,035,321 B2 | 4/2006 | Balaberda | |
| 8,599,906 B2 | 12/2013 | Proctor, Jr. et al. | |
| 8,837,559 B2 | 9/2014 | Jovanovic | |
| 9,154,237 B2 | 10/2015 | Maca | |
| 2005/0215193 A1 | 9/2005 | Kummetz | |
| 2009/0196215 A1* | 8/2009 | Sabat ................... | H03G 3/3047 370/315 |
| 2013/0034045 A1* | 2/2013 | Kwon ..................... | H04L 41/12 370/315 |
| 2015/0092825 A1 | 4/2015 | Gao et al. | |
| 2017/0181150 A1* | 6/2017 | Lee ................... | H04W 72/0406 |

FOREIGN PATENT DOCUMENTS

| | | |
|---|---|---|
| KR | 20010087979 | 9/2001 |
| WO | 2015026130 | 2/2015 |

* cited by examiner

*Primary Examiner* — Philip Sobutka

(57) ABSTRACT

A wireless repeater chain exerts frequency control. A source wireless repeater wirelessly repeats a Radio Frequency (RF) signal that comprises multiple component frequencies. A target wireless repeater wirelessly receives and processes the repeated RF signal to determine frequency responses through the wireless repeater chain for each of the multiple component frequencies. The target wireless repeater processes the frequency responses to determine frequency gains for each of the multiple component frequencies. The target wireless repeater wirelessly transfers the frequency gains for each of the multiple component frequencies for delivery to the source wireless repeater. The source wireless repeater wirelessly receives the frequency gains for each of the multiple component frequencies and responsively applies the frequency gains to the multiple component frequencies.

20 Claims, 5 Drawing Sheets

US 10,020,869 B1

WIRELESS REPEATER CHAIN TO EXERT FREQUENCY CONTROL

TECHNICAL BACKGROUND

Wireless communication systems transfer data packets between User Equipment (UE) to provide data communication services, like internet access, voice calls, media streaming, user messaging, among other communication services. Wireless communication systems allow users to move about and communicate over the air with access communication.

To expand or enhance the wireless signal coverage of a wireless communication network, repeaters may be added to locations not adequately covered by current network infrastructure. A repeater transmits and receives wireless signals exchanged between UEs and a wireless access point. Without the signal repetition provided by the wireless repeater, the coverage area of the wireless network access point may otherwise have not extended far enough to serve the UEs using the repeater. Thus, a wireless repeater provides a less resource intensive means for increasing wireless network coverage.

Although repeaters are a useful solution to expanding network coverage, each repeater has a frequency response across multiple component frequencies. This may cause a ripple effect in which the accumulated frequency response across the multiple component frequencies for a repeater further down a repeater chain may be significantly deteriorated. Unfortunately, current methods of exerting frequency control in a cascading repeater chain are neither efficient nor effective.

TECHNICAL OVERVIEW

A wireless repeater chain exerts frequency control. A source wireless repeater wirelessly repeats a Radio Frequency (RF) signal that comprises multiple component frequencies. A target wireless repeater wirelessly receives and processes the repeated RF signal to determine frequency responses through the wireless repeater chain for each of the multiple component frequencies. The target wireless repeater processes the frequency responses to determine frequency gains for each of the multiple component frequencies. The target wireless repeater wirelessly transfers the frequency gains for each of the multiple component frequencies for delivery to the source wireless repeater. The source wireless repeater wirelessly receives the frequency gains for each of the multiple component frequencies and responsively applies the frequency gains to the multiple component frequencies.

DETAILED DESCRIPTION

Figure 1:
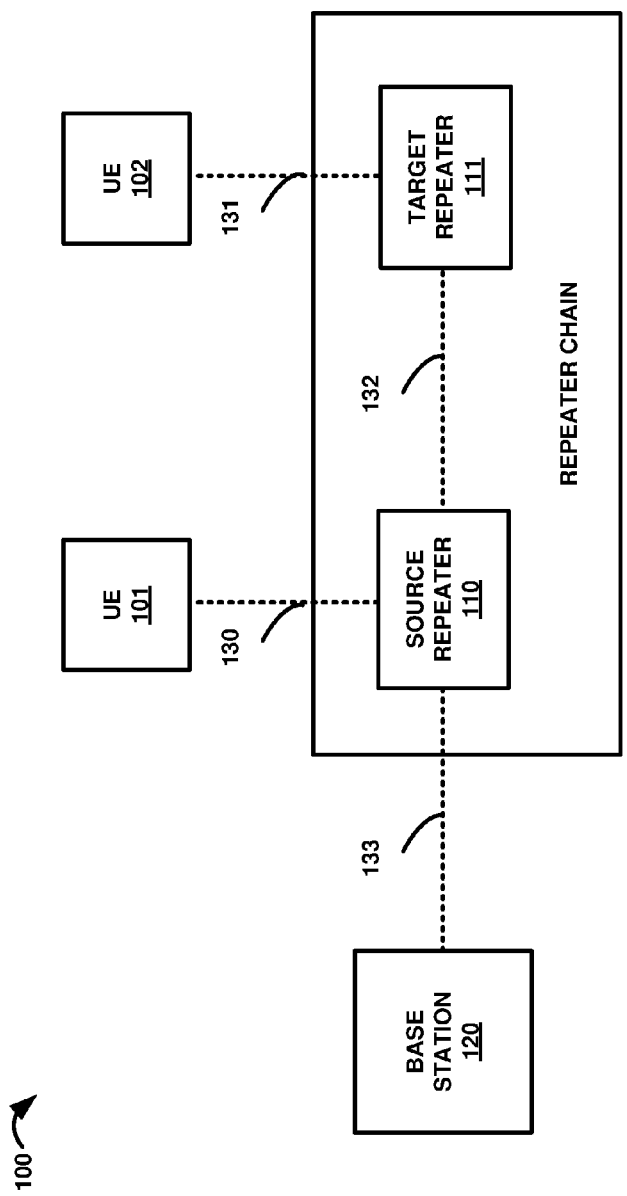
FIGS. 1-2 illustrate a wireless communication system to exert frequency control in a wireless repeater chain.
Figure 2:
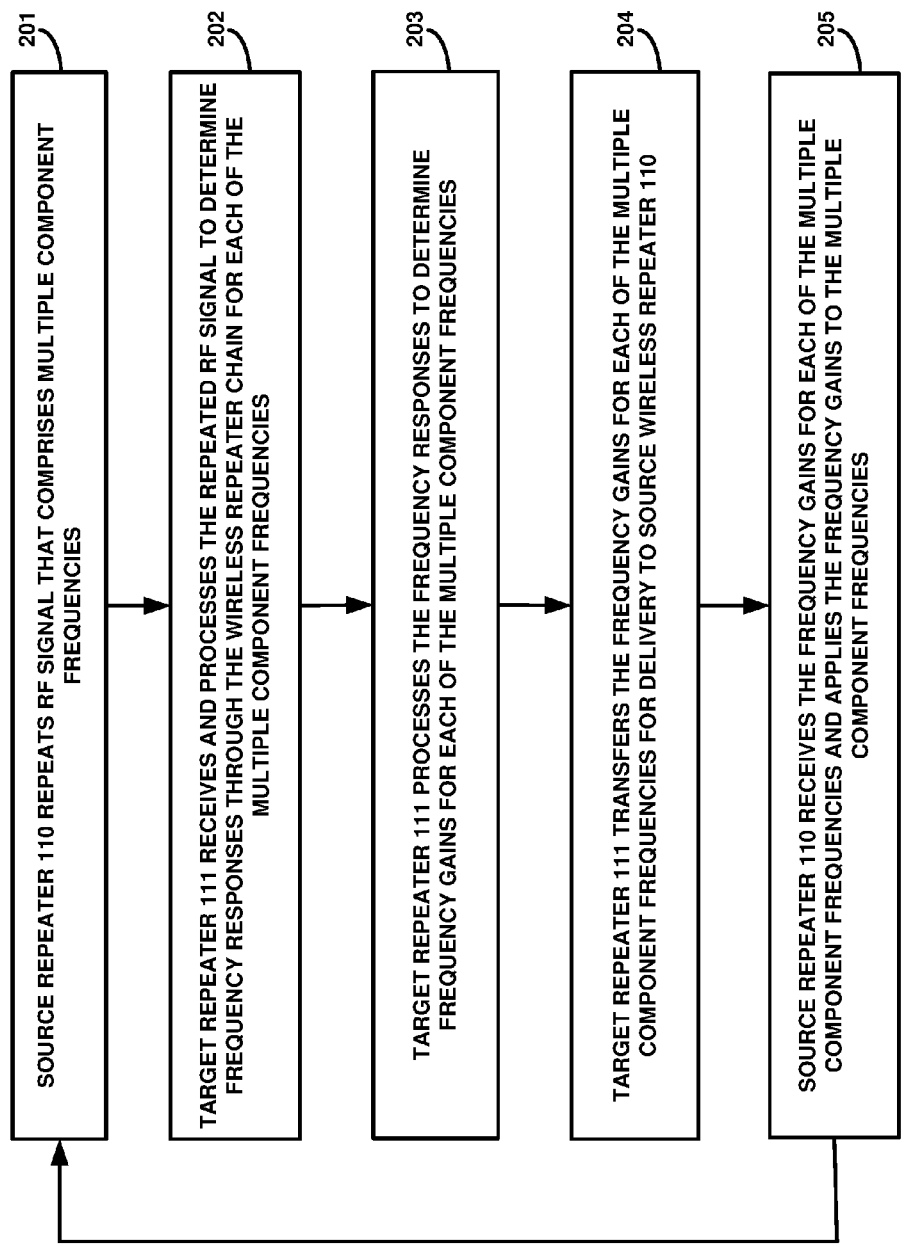

FIGS. 1-2 illustrate wireless communication system 100 to exert frequency control. Referring to FIG. 1, wireless communication system 100 comprises User Equipment (UEs) 101-102, source wireless repeater 110, target wireless repeater 111, and wireless base station 120. UE 101 communicates with source wireless repeater 110 over wireless link 130. UE 102 communicates with target wireless repeater 111 over wireless link 131. Source wireless repeater 110 communicates with target wireless repeater 111 in the wireless repeater chain over wireless link 132. Source wireless repeater 110 communicates with wireless base station 120 over communication link 133.

UEs 101-102 could each be a phone, tablet computer, media device, an intelligent machine, or some other apparatus having a wireless transceiver. UEs 101-102 include processing circuitry and memory that store and execute various software modules. UEs 101-102 may wirelessly receive and transmit Radio Frequency (RF) signals to wireless repeaters 110-111.

Wireless base station 120 may comprise a macro base station, a wireless hotspot, an evolved NodeB (eNodeB), or some other base station that may provide wireless communication services to UEs 101-102 over wireless repeaters 110-111. Wireless base station 120 includes RF communication circuitry, communication interfaces, network interfaces, processing systems, microprocessors, storage systems, storage media, or some other processing devices or software systems, and may be distributed among multiple devices.

Wireless repeaters 101-111 may comprise a mini-macro cell, a femtocell, a picocell, or some other wireless base station capable of providing wireless communication services to UEs 101-102 from wireless base station 120. Wireless repeaters 110-111 in this repeater chain typically include amplifiers, filters, RF modulators, and signal processing circuitry. Wireless repeaters 110-111 may be configured to provide wireless coverage to one or more UEs for voice calls, media streaming, internet access, text messages, and the like. Wireless repeaters 110-111 are capable of receiving and transmitting an RF signal that comprises multiple component frequencies.

Wireless communication links 130-133 use air or space as the transport media. Wireless communication links 130-133 may use various protocols, such as Long Term Evolution (LTE), Code Division Multiple Access (CDMA), Orthogonal Frequency Division Multiplexing Access (OFDMA), LTE Wireless Aggregation (LWA), Internet Protocol (IP), Evolution Data Only (EVDO), Worldwide Interoperability for Microwave Access (WIMAX), Global System for Mobile Communication (GSM), LTE, Wireless Fidelity (WIFI), High Speed Packet Access (HSPA), or some other wireless communication format—including combinations thereof.

In operation, source wireless repeater 110 wirelessly repeats an RF signal that comprises multiple component frequencies. The multiple component frequencies may include a frequency range which is divided into multiple sub-ranges to form frequency channels within each frequency band. For example, a frequency band of 2.5 GHz is divided into twenty frequency channels.

In some examples, the RF signal that comprises multiple frequency components may be an uplink Sounding Reference Signal (SRS). For example, the uplink SRS may be sent from UE 101 to source wireless repeater 110 to be repeated through the wireless repeater chain to wireless base station 120. In other examples, the RF signal comprises a Downlink Reference Signal (DL-RS). For example, wireless base station 120 may transmit wireless signaling and data to source wireless repeater 110 which is then repeated through the wireless repeater chain to target wireless repeater 111. Target wireless repeater 111 would then broadcast the DL- RS to UE 102 indicating network access data, such as a mobile country code, mobile network code, channel bandwidth, channel scheduling sequences, and other access data used by UE 102.

In some examples, the RF signal comprises a synthetic RF signal. A synthetic RF signal is a wireless signal input into the wireless repeater chain to test the frequency response for multiple component frequencies. The synthetic RF signal may be received by source wireless repeater 110 from a wireless base station, such as wireless base station 120, and repeated through the wireless repeater chain to target wireless repeater 111. In other examples, source wireless repeater 110 may inject the synthetic RF signal itself and repeater the synthetic RF signal through the wireless repeater chain to target wireless repeater 111.

In a next operation, target wireless repeater 111 receives and processes the repeater RF signal to determine frequency responses through the wireless repeater chain for each of the multiple component frequencies. The frequency response may be a deterioration of the RF signal. In some examples, target wireless repeater 111 receives the RF signal using a probe inserted in target wireless repeater 111.

Target wireless repeater 111 processes the frequency responses to determine frequency gains for each of the multiple component frequencies. Target wireless repeater 111 may determine the frequency gains by comparing the received RF signal to an expected frequency gain stored in target wireless repeater 111 or received from source wireless repeater 110. In some examples, processing the frequency response to determine frequency gains may include adjusting frequency coefficients for each of the multiple component frequencies.

Target wireless repeater 111 wirelessly transfers the frequency gains for each of the multiple component frequencies for delivery to source wireless repeater 110. Target wireless repeater 111 may wirelessly transfer the frequency gains for each of the multiple component frequencies from a modem in target wireless repeater 111 to a modem in source wireless repeater 110. In other examples, target wireless repeater 111 may wirelessly transfer the frequency gains for each of the multiple component frequencies from a modem in target wireless repeater 111 to wireless base station 120 serving source wireless repeater 110.

Source wireless repeater 110 wirelessly receives the frequency gains for each of the multiple component frequencies and responsively applies the frequency gains to the multiple component frequencies. Source wireless repeater 110 may receive the frequency gain for each of the multiple component frequencies from target wireless repeater 111 directly or from another network element, such as wireless base station 120. In some examples, a modem in source wireless repeater 110 receives the frequency gains for each of the multiple component frequencies. In other examples, a Digital Signal Processor (DSP) in source wireless repeater 110 applies the frequency gains to the multiple component frequencies. Source wireless repeater 110 may apply the frequency gains to the multiple component frequencies by modifying the coefficients used for each of the multiple component frequencies.

FIG. 2 is a flow diagram illustrating an operation of wireless communication system 100 to exert frequency control in the wireless repeater chain. Source wireless repeater 110 wirelessly repeats (201) an RF signal that comprises multiple component frequencies. Target wireless repeater 111 wirelessly receives (202) and processes (202) the repeated RF signal to determine frequency responses through the wireless repeater chain for each of the multiple component frequencies. Target wireless repeater 111 processes (203) the frequency responses to determine frequency gains for each of the multiple component frequencies. Target wireless repeater 111 wirelessly transfers (204) the frequency gains for each of the multiple component frequencies for delivery to source wireless repeater 110. Source wireless repeater 110 wirelessly receives (205) the frequency gains for each of the multiple component frequencies and responsively applies (205) the frequency gains to the multiple component frequencies.

Figure 3:
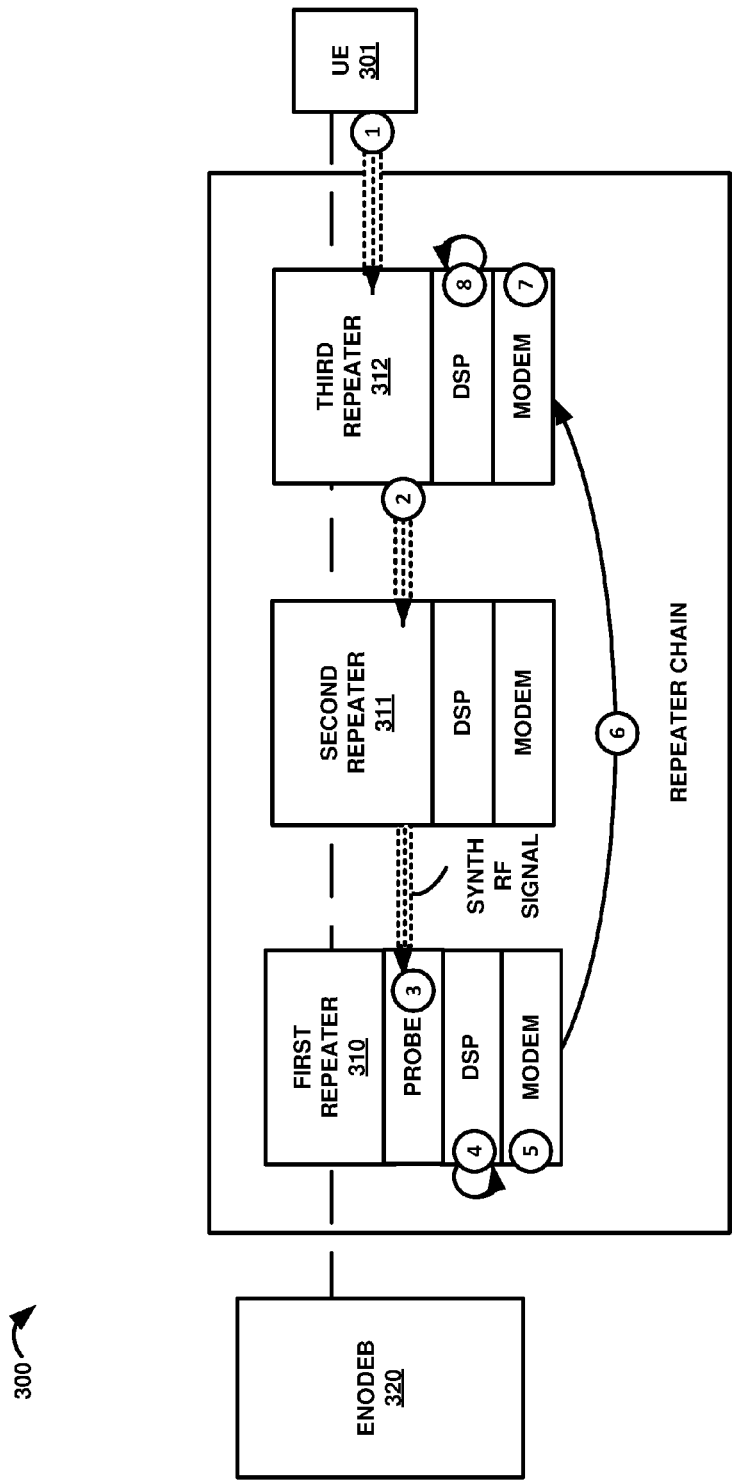
FIGS. 3-4 illustrate a Long Term Evolution (LTE) communication system to exert frequency control in a wireless repeater chain.

FIG. 3 illustrates LTE communication system 300 to exert frequency control in a wireless repeater chain. LTE communication system 300 is an example of wireless communication system 100, although wireless communication system 100 may use alternative configurations and operations. LTE communication system 300 comprises UE 301, wireless repeaters 310-312, and eNodeB 320. Wireless repeaters 310-312 each comprise a modem and a DSP. First wireless repeater 310 also includes a probe.

As indicated by the dashed lines, UE 301 exchanges data and signaling with eNodeB 320 over wireless repeaters 310-312. As indicated by the multiple dotted lines and arrows, third wireless repeater 312 is repeating an uplink SRS RF signal that comprises multiple component frequencies from UE 301 toward first wireless repeater 310.

In a first operation, third wireless repeater 312 wirelessly receives the uplink SRS RF signal that consists of multiple frequency components from UE 301 and repeats the uplink SRS RF signal through the repeater chain to first wireless repeater 310. First wireless repeater 310 wirelessly receives the repeated uplink SRS RF signal in the probe and transfers the repeated uplink SRS RF signal to the DSP in first wireless repeater 310.

In a next operation, the DSP in first wireless repeater 310 processes the repeated uplink SRS RF signal to determine frequency responses through the wireless repeater chain for each of the multiple component frequencies. The DSP in first wireless repeater 310 then processes the frequency responses to determine frequency gains including modified coefficients for each of the multiple component frequencies. The DSP in first wireless repeater 310 then transfers the frequency gains including the modified coefficients for each of the multiple component frequencies to the modem in first wireless repeater 310.

In response, the modem in first wireless repeater 310 wirelessly transfers the frequency gains for each of the multiple component frequencies to the modem in third wireless repeater 312. Third wireless repeater 312 then receives the frequency gains for each of the multiple component frequencies and applies the frequency gains in the DSP of third wireless repeater.

Figure 4:
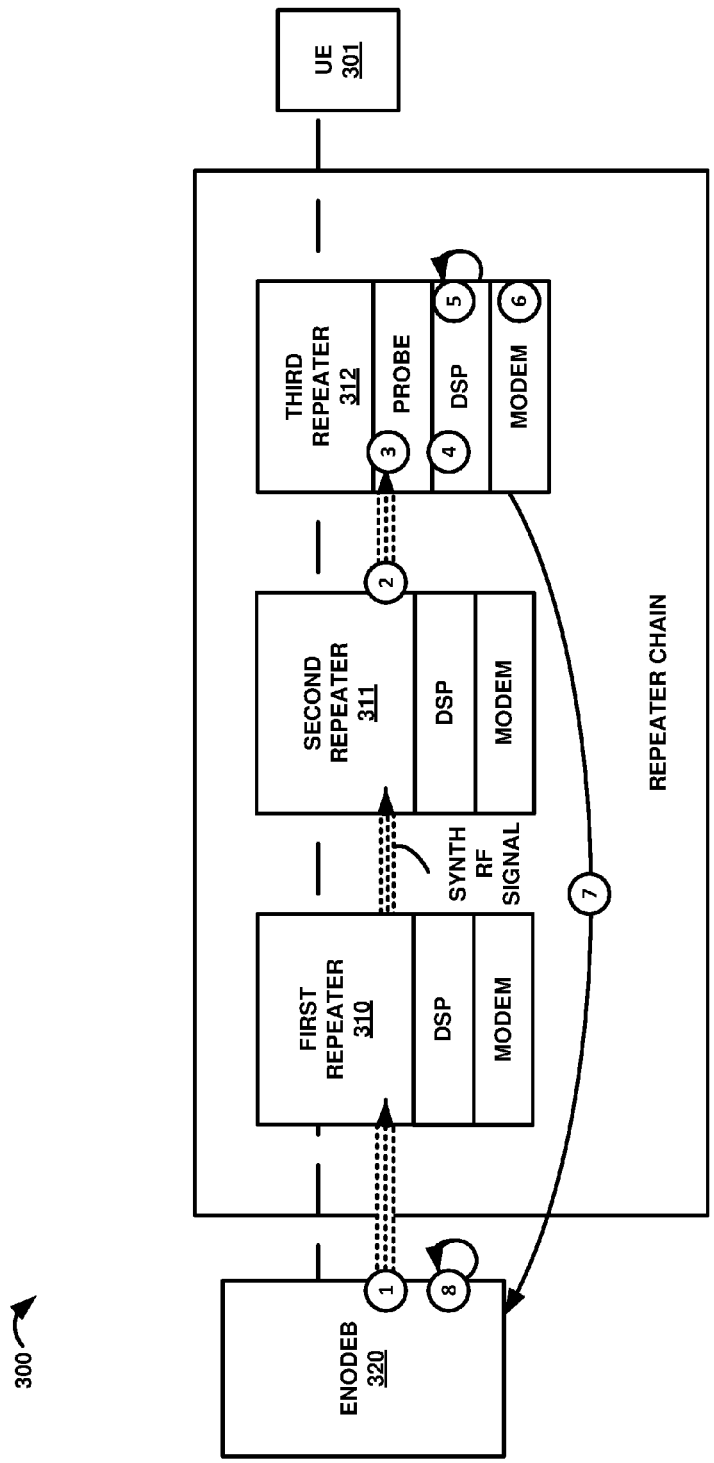

FIG. 4 illustrates an alternative operation of LTE communication system 300 to exert frequency control in a wireless repeater chain. As indicated by the dashed lines, UE 301 exchanges data and signaling with eNodeB 320 over wireless repeaters 310-312. As indicated by the multiple dotted lines and arrows, first wireless repeater 310 is repeating a synthetic RF signal that comprises multiple component frequencies from eNodeB 320 toward third wireless repeater 312. In this example embodiment, third wireless repeater 312 includes a probe.

In a first operation, first wireless repeater 310 wirelessly receives the synthetic RF signal that consists of multiple frequency components from eNodeB 320 and repeats the synthetic RF signal through the repeater chain to third wireless repeater 312. Third wireless repeater 312 wirelessly receives the repeated synthetic RF signal in the probe and transfers the repeated synthetic RF signal to the DSP in third wireless repeater 312.

In a next operation, the DSP in third wireless repeater 312 processes the repeated synthetic RF signal to determine frequency responses through the wireless repeater chain for each of the multiple component frequencies. The DSP in third wireless repeater 312 then processes the frequency responses to determine frequency gains including modified coefficients for each of the multiple component frequencies. The DSP in third wireless repeater 312 then transfers the frequency gains including the modified coefficients for each of the multiple component frequencies to the modem in third wireless repeater 312.

In response, the modem in third wireless repeater 312 wirelessly transfers the frequency gains for each of the multiple component frequencies to eNodeB 320. eNodeB 320 then applies the frequency gains for each of the multiple component frequencies. A modified synthetic RF signal that comprises the multiple component frequencies using the modified coefficients is then wirelessly transferred to first wireless repeater 310 to be repeated through the wireless repeater chain to third wireless repeater 312.

Figure 5:
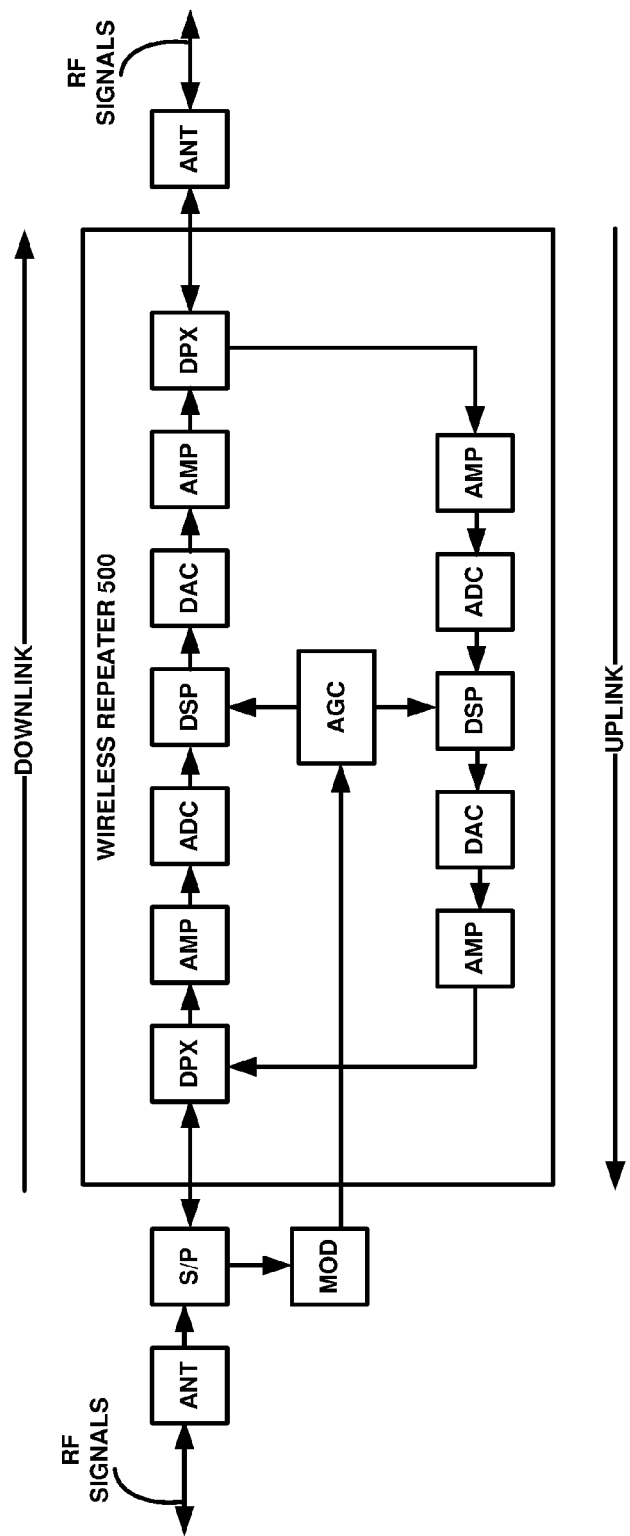
FIG. 5 illustrates a wireless repeater in a wireless repeater chain to exert frequency control in a wireless repeater chain.

FIG. 5 illustrates wireless repeater 500 to exert frequency control in a wireless repeater chain. Wireless repeater 500 is an example of wireless repeaters 110-111 and wireless repeaters 310-312, although wireless repeaters 110-111 and wireless repeaters 310-312 may use alternative configurations and operations. Wireless repeater 500 includes RF signals with multiple frequency components, antenna systems, Automatic Gain Control (AGC) systems, a splitter (S/P), and a modem (MOD). Wireless repeater 500 also includes duplexers (DPX), amplifiers (AMP), analog-to-digital converters (ADC), digital signaling processing systems (DSP), and digital-to-analog converters (DAC).

In operation, RF signals that comprise multiple frequency components are input into wireless repeater 500. RF signals may be uplink signals, downlink signals, or synthetic signals inserted by wireless repeater 500, received from another wireless repeater, or received from a wireless base station. The RF signals are then delivered to the splitter, which splits the RF signals and transfers the split RF signals to a modem and a duplexer. The duplexer transfers the RF signals and the target RF signals to the amplifier.

At this point in the process, RF signals are transferred to an analog-to-digital converter by the amplifier and the converter transfers the converted RF signals to a DSP. The DPS processes frequency responses and determines frequency gains. The DPS can also apply received frequency gains. After processing, the RF signals are transferred to a digital-to-analog convertor, which converts the RF signals and transfers the converted RF signals to an amplifier.

The amplifier then transfers the RF signals to a duplexer that transfers the RF signals to another antenna system. Downlink RF signals go from left to right and uplink RF signals go from right to left. The modem transfers the RF signals to the other AGC, which processes the RF signals and determines whether to apply AGC. The other AGC then transfers AGC instructions to the wireless signal processors, as needed. In some examples, the same AGC instruction is sent to the wireless signal processors in both the downlink and uplink.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A wireless repeater chain to exert frequency control over individual frequency channels within a frequency band, the method comprising:
    a source wireless repeater wirelessly repeating Radio Frequency (RF) signals in each of the individual frequency channels;
    additional wireless repeaters wirelessly repeating the RF signals in each of the individual frequency channels between the source wireless repeater and a target wireless repeater;
    a target wireless repeater wirelessly receiving and processing the repeated RF signals from the wireless repeater chain for each of the individual frequency channels to determine individual frequency responses through the wireless repeater chain for each of the individual frequency channels;
    the target wireless repeater processing the individual frequency responses for each of the individual frequency channels through the wireless repeater chain to determine individual frequency gains for each of the individual frequency channels;
    the target wireless repeater wirelessly transferring the individual frequency gains for each of the individual frequency channels for delivery to the source wireless repeater; and
    the source wireless repeater wirelessly receiving the individual frequency gains for each of the individual frequency channels and responsively applying the individual frequency gains to the individual frequency channels in the frequency band.

2. The method of claim 1 wherein the target wireless repeater wirelessly transferring the individual frequency gains for each of the individual frequency channels for delivery to the source wireless repeater comprises a modem in the target repeater wirelessly transferring the individual frequency gains for each of the individual frequency channels for delivery to the source wireless repeater.

3. The method of claim 1 wherein the source wireless repeater wirelessly receiving the individual frequency gains for each of the individual frequency channels and responsively applying the frequency gains to the individual frequency channels comprises a modem in the source wireless repeater wirelessly receiving the individual frequency gains for each of the individual frequency channels and a Digital Signal Processor (DSP) in the source wireless repeater responsively applying the individual frequency gains to the individual frequency channels.

4. The method of claim 1 wherein the target wireless repeater wirelessly receiving and processing the repeated RF signals to determine the individual frequency responses through the wireless repeater chain for each of the individual frequency channels comprises a probe in the target wireless repeater in the wireless repeater chain receiving and processing the repeated RF signals to determine the individual frequency responses through the wireless repeater chain for each of the individual frequency channels.

5. The method of claim 1 wherein the source wireless repeater wirelessly repeating the RF signals comprises the source wireless repeater in the wireless repeater chain wirelessly repeating uplink Sounding Reference Signals (SRS).

6. The method of claim 1 wherein the source wireless repeater wirelessly repeating the RF signals comprises the source wireless repeater in the wireless repeater chain wirelessly repeating Downlink Reference Signals (DL-RS).

7. The method of claim 1 wherein the source wireless repeater wirelessly repeating the RF signals comprises the source wireless repeater in the wireless repeater chain wirelessly repeating synthetic RF signals received from a wireless base station.

8. The method of claim 1 wherein the source wireless repeater wirelessly repeating the RF signals comprises the source wireless repeater in the wireless repeater chain wirelessly injecting synthetic RF signals.

9. The method of claim 1 wherein the target wireless repeater processing the individual frequency responses to determine the individual frequency gains comprises the target wireless repeater processing the individual frequency responses to determine modified coefficients for each of the individual frequency channels.

10. The method of claim 1 wherein the source wireless repeater wirelessly receiving the individual frequency gains for each of the individual frequency channels and responsively applying the individual frequency gains to the individual frequency channels comprises the source wireless repeater wirelessly receiving modified coefficients for each of the individual frequency channels and applying the modified coefficients to each of the individual frequency channels.

11. A wireless repeater chain to exert frequency control over individual frequency channels within a frequency band, the wireless repeater chain comprising:
a source wireless repeater configured to wirelessly repeat Radio Frequency (RF) signals in each of the individual frequency channels;
a target wireless repeater configured to wirelessly receive and process the repeated RF signals from the wireless repeater chain for each of the individual frequency channels to determine individual frequency responses through the wireless repeater chain for each of the individual frequency channels;
additional wireless repeaters configured to wirelessly repeat the RF signals in each of the individual frequency channels between the source wireless repeater and a target wireless repeater;
the target wireless repeater configured to process the individual frequency responses for the individual frequency channels through the wireless repeater chain to determine individual frequency gains for each of the individual frequency channels;
the target wireless repeater configured to wirelessly transfer the individual frequency gains for each of the individual frequency channels for delivery to the source wireless repeater; and
the source wireless repeater configured to wirelessly receive the individual frequency gains for each of the individual frequency channels and responsively apply the individual frequency gains to the individual frequency channels in the frequency band.

12. The wireless repeater chain of claim 11 wherein the target wireless repeater configured to wirelessly transfer the individual frequency gains for each of the individual frequency channels for delivery to the source wireless repeater comprises a modem in the target wireless repeater configured to wirelessly transfer the individual frequency gains for each of the individual frequency channels for delivery to the source wireless repeater.

13. The wireless repeater chain of claim 11 wherein the source wireless repeater configured to wirelessly receive the individual frequency gains for each of the individual frequency channels and responsively apply the individual frequency gains to the individual frequency channels comprises a modem in the source wireless repeater configured to wirelessly receive the individual frequency gains for each of the individual frequency channels and a Digital Signal Processor (DSP) in the source wireless repeater configured to apply the individual frequency gains to the individual frequency channels.

14. The wireless repeater chain of claim 11 wherein the target wireless repeater configured to wirelessly receive and process the repeated RF signals to determine the individual frequency responses through the wireless repeater chain for each of the individual frequency channels comprises a probe in the target wireless repeater configured to receive and process the repeated RF signals to determine the individual frequency responses through the wireless repeater chain for each of the individual frequency channels.

15. The wireless repeater chain of claim 11 wherein the source wireless repeater configured to wirelessly repeat the RF signals comprises the source wireless repeater configured to wirelessly repeat uplink Sounding Reference Sinal Signals (SRS).

16. The wireless repeater chain of claim 11 wherein the source wireless repeater configured to wirelessly repeat the RF signals comprises the source wireless repeater configured to wirelessly repeat Downlink Reference Signals (DL-RS).

17. The wireless repeater chain of claim 11 wherein the source wireless repeater configured to wirelessly repeat the RF signals comprises the source wireless repeater configured to wirelessly repeat synthetic RF signals received from a wireless base station.

18. The wireless repeater chain of claim 11 wherein the source wireless repeater configured to wirelessly repeat the RF signals comprises the source wireless repeater configured to wirelessly inject synthetic RF signals.

19. The wireless repeater chain of claim 11 wherein the target wireless repeater configured to process the individual frequency responses to determine the individual frequency gains for each of the individual frequency channels comprises the target wireless repeater configured to process the individual frequency responses to determine modified coefficients for each of the individual frequency channels.

20. The wireless repeater chain of claim 11 wherein the source wireless repeater configured to wirelessly receive the individual frequency gains for each of the individual frequency channels and responsively apply the individual frequency gains to the individual frequency channels comprises the source wireless repeater configured to wirelessly receive modified coefficients for each of the individual frequency channels and apply the modified coefficients to each of the individual frequency channels.

* * * * *